United States Patent
Ni et al.

(10) Patent No.: US 12,112,157 B2
(45) Date of Patent: Oct. 8, 2024

(54) FIRMWARE UPGRADE METHOD AND FIRMWARE UPGRADE SYSTEM BASED ON MULTI-STREAM TRANSMISSION MODE OF DISPLAYPORT INTERFACE

(71) Applicant: REALTEK SEMICONDUCTOR CORP., Hsinchu (TW)

(72) Inventors: Wen-Juan Ni, Suzhou (CN); Hao Zhou, Suzhou (CN); Tao Xu, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 98 days.

(21) Appl. No.: 17/741,563

(22) Filed: May 11, 2022

(65) Prior Publication Data
US 2023/0236817 A1 Jul. 27, 2023

(30) Foreign Application Priority Data
Jan. 26, 2022 (CN) .......................... 202210094060.9

(51) Int. Cl.
G06F 8/65 (2018.01)
G06F 3/14 (2006.01)

(52) U.S. Cl.
CPC .............. *G06F 8/65* (2013.01); *G06F 3/1423* (2013.01)

(58) Field of Classification Search
CPC ................................ G06F 8/65; G06F 3/1423
USPC .................................................. 717/168–174
See application file for complete search history.

(56) References Cited

U.S. PATENT DOCUMENTS

| 6,633,905 | B1 * | 10/2003 | Anderson | H04L 67/125 709/224 |
| 7,010,607 | B1 * | 3/2006 | Bunton | H04L 1/18 709/228 |
| 7,146,412 | B2 * | 12/2006 | Turnbull | G06F 8/65 717/173 |
| 7,370,322 | B1 * | 5/2008 | Matena | G06F 8/65 717/169 |

(Continued)

OTHER PUBLICATIONS

Bettayeb et al, "Hyperledger-Based Secure Firmware Update Delivery for IoT Devices", ACM, pp. 1-5 (Year: 2021).*

(Continued)

*Primary Examiner* — Anil Khatri
(74) *Attorney, Agent, or Firm* — Li & Cai Intellectual Property (USA) Office

(57) ABSTRACT

A firmware upgrade method and a firmware upgrade system based on a multi-stream transmission mode of a DisplayPort interface are provided. The firmware upgrade method includes: configuring a host to obtain firmware information of the displays through a DisplayPort auxiliary channel, and select a target display for firmware upgrade; and executing a firmware upgrade process including: configure the host to send a upgrade start command and firmware upgrade data to the target display; and configuring each display to: determine whether the upgrade start command and the firmware upgrade data reach the target display, and if not, send the upgrade start command and the firmware upgrade data to the next display, if so, execute a firmware upgrade preparation process according to the upgrade start command, and write the firmware upgrade data into the firmware storage device of the target display.

18 Claims, 9 Drawing Sheets

(56) References Cited

U.S. PATENT DOCUMENTS

| | | | | |
|---|---|---|---|---|
| 7,802,246 | B1* | 9/2010 | Kennedy | G06F 8/61 717/173 |
| 8,527,471 | B2* | 9/2013 | Hoprich | G06F 16/211 707/674 |
| 8,670,457 | B2* | 3/2014 | Anderson | H04L 65/80 370/454 |
| 8,762,977 | B2* | 6/2014 | Olsson | G06F 8/60 717/120 |
| 8,838,084 | B2* | 9/2014 | Madej | H04L 41/0863 455/418 |
| 8,887,144 | B1* | 11/2014 | Marr | G06F 9/4416 717/172 |
| 9,032,053 | B2* | 5/2015 | Kosuru | H04L 41/082 709/227 |
| 10,261,775 | B1* | 4/2019 | Ramsay | G06F 8/65 |
| 10,289,400 | B2* | 5/2019 | De Zaeytijd | G06F 8/65 |
| 11,126,723 | B2* | 9/2021 | Bagulho Monteiro Pereira | G06F 21/566 |
| 11,669,322 | B2* | 6/2023 | Nolan | G06F 8/65 717/168 |
| 11,704,110 | B2* | 7/2023 | Liu | G06F 8/65 717/168 |
| 11,956,265 | B2* | 4/2024 | Dahlberg | H04L 63/1433 |
| 2021/0279048 | A1 | 9/2021 | Ni et al. | |

OTHER PUBLICATIONS

Yohan et al, "An Over-the-Blockchain Firmware Update Framework for IoT Devices", IEEE, pp. 1-8 (Year: 2018).*

Eberle et a, "Classes of Service for Daisy Chain Interconnects", IEEE, pp. 147-153 (Year: 2012).*

Kim et al, "Remote Progressive Firmware Update for Flash-Based Networked Embedded Systems", ACM, pp. 407-412 (Year: 2009).*

Decentralized Massive MIMO Processing Exploring Daisy-Chain Architecture and Recursive Algorithms, IEEE, pp. 687-700 (Year: 2020).*

Waayers et al, "Definition of a robust Modular SOC Test Architecture; Resurrection of the single TAM daisy-chain", IEEE, pp. 1-10 ( Year: 2005).*

* cited by examiner

FIRMWARE UPGRADE METHOD AND FIRMWARE UPGRADE SYSTEM BASED ON MULTI-STREAM TRANSMISSION MODE OF DISPLAYPORT INTERFACE

CROSS-REFERENCE TO RELATED PATENT APPLICATION

This application claims the benefit of priority to China Patent Application No. 202210094060.9, filed on Jan. 26, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a firmware upgrade method and a firmware upgrade system, and more particularly to a firmware upgrade method and a firmware upgrade system based on a multi-stream transport mode of a DisplayPort interface.

BACKGROUND OF THE DISCLOSURE

Firmware upgrade refers to an improvement of a working program or original program codes in a hardware through a special upgrade program, so as to improve compatibility, performance or function. The firmware upgrade is performed from a bottom layer of a device, and is thus more direct, more efficient, and leads to more considerable improvements in performance. Such an upgrade can improve the performance of the device repeatedly, so as to achieve a full potential of the device.

In the related art, when upgrading a firmware of a display, a special hardware adapter board is utilized to transmit firmware data from a computer device to an interface connected with the display, or a video transmission interface of the computer is utilized to transmit a new firmware to the display, so as to conduct the firmware upgrade. During the firmware upgrade, the device may not work properly, and only one display device can be upgraded at a time.

This makes it inconvenient for users who need to manage a large number of display devices.

SUMMARY OF THE DISCLOSURE

In response to the above-referenced technical inadequacies, the present disclosure provides a firmware upgrade method and a firmware upgrade system based on a multi-stream transport mode of a DisplayPort interface.

In one aspect, the present disclosure provides a firmware upgrade method based on a multi-stream transport mode of a DisplayPort (DP) interface, the firmware upgrade method is suitable for a plurality of displays and a host connected in a daisy chain topology, and the firmware upgrade method includes: configuring a communication module of the host to obtain a plurality of records of firmware information of the plurality of displays through a DP auxiliary channel of a host DP interface, and to select a target display of the plurality of displays for firmware upgrade; performing a firmware upgrade process, including: configuring a host firmware upgrade module of the host to transmit a upgrade start command and firmware upgrade data to the target display; configuring each of the plurality of displays to: receive the upgrade start command and the firmware upgrade data from a display DP interface through a receiver circuit; configure a multi-stream processing module to determine whether the upgrade start command and the firmware upgrade data reach the target display; in response to determining that the upgrade start command and the firmware upgrade data do not reach the target display, configure the multi-stream processing module to transmit the upgrade start command and the firmware upgrade data to next one of the displays in the daisy chain topology through the transmitter circuit; and in response to determining that the upgrade start command and the firmware upgrade data reach the target display, configure a display firmware upgrade module to execute a firmware upgrade preparation process according to the upgrade start command, and write the firmware upgrade data to a firmware storage device of the target display. The firmware upgrade process further includes: configuring the host firmware upgrade module of the host to transmit a request for obtaining a firmware upgrade result to the target display; and configuring each of the plurality of displays to: receive the request for obtaining the firmware upgrade result through the receiver circuit; configured the multi-stream processing module to determine whether the request for obtaining the firmware upgrade result reaches the target display; in response to determining that the request for obtaining the firmware upgrade result does not reach the target display, transmit the request to the next display through the transmitter circuit; and in response to determining that the request for obtaining the firmware upgrade result reaches the target display, configure the display firmware upgrade module to check firmware data in the firmware storage device and transmit an upgrade result message to the host.

In another aspect, the present disclosure provides a firmware upgrade system based on a multi-stream transport (MST) mode of a DisplayPort (DP) interface, and the firmware upgrade system includes a plurality of displays and a host. The plurality of displays each includes a receiver circuit, a multi-stream processing module, a display firmware upgrade module and a firmware storage device. The receiver circuit is connected to a display DP interface. The multi-stream processing module is connected to the receiver circuit. The display firmware upgrade module is connected to the multi-stream processing module. The firmware storage device is configured to store a firmware. The host is connected in series with the displays in a daisy chain topology, and the host includes a communication module and a host firmware upgrade module. The communication module is connected to a host DP interface, and is configured to obtain a plurality of records of firmware information of the plurality of displays through a DP auxiliary channel. The host firmware upgrade module is configured to select a target display of the plurality of displays for firmware upgrade. The host and the plurality of displays are configured to execute a firmware upgrade process, including: configuring the host firmware upgrade module to transmit a upgrade start command and firmware upgrade data to the target display; configuring each of the plurality of displays to: receive the upgrade start command and the firmware upgrade data through the receiver circuit; configure the multi-stream processing module to determine whether the upgrade start command and the firmware upgrade data reach the target display; in response to determining that the upgrade start command and the firmware upgrade data do not reach the target display, configure the multi-stream processing module to transmit the upgrade start command and the firmware upgrade data to next one of the displays in the daisy chain topology through the transmitter circuit; and in response to determining that the upgrade start command and the firmware upgrade data reach the target display, configure a display firmware upgrade module to execute a firmware upgrade preparation process according to the upgrade start command, and write the firmware upgrade data to a firmware storage device of the target display. The firmware upgrade process further includes: configuring the host firmware upgrade module to transmit a request for obtaining a firmware upgrade result to the target display; and configuring each of the plurality of displays to: receive the request for obtaining the firmware upgrade result through the receiver circuit; configured the multi-stream processing module to determine whether the request for obtaining the firmware upgrade result reaches the target display; in response to determining that the request for obtaining the firmware upgrade result does not reach the target display, transmit the request to the next display through the transmitter circuit; and in response to determining that the request for obtaining the firmware upgrade result reaches the target display, configure the display firmware upgrade module to check firmware data in the firmware storage device and transmit an upgrade result message to the host.

Therefore, in the firmware upgrade method and the firmware upgrade system provided by the present disclosure, based on MST functions under DP standards, the sideband message of an auxiliary channel of the DP interface or a secondary data packet (SDP) of the main link of the DP interface can be utilized to upgrade the firmware of any display on an MST link of the DP interface, or to upgrade the firmware of all displays on the MST link at the same time. Therefore, the costs associated with firmware upgrading can be reduced, and the efficiency of firmware upgrading can be improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
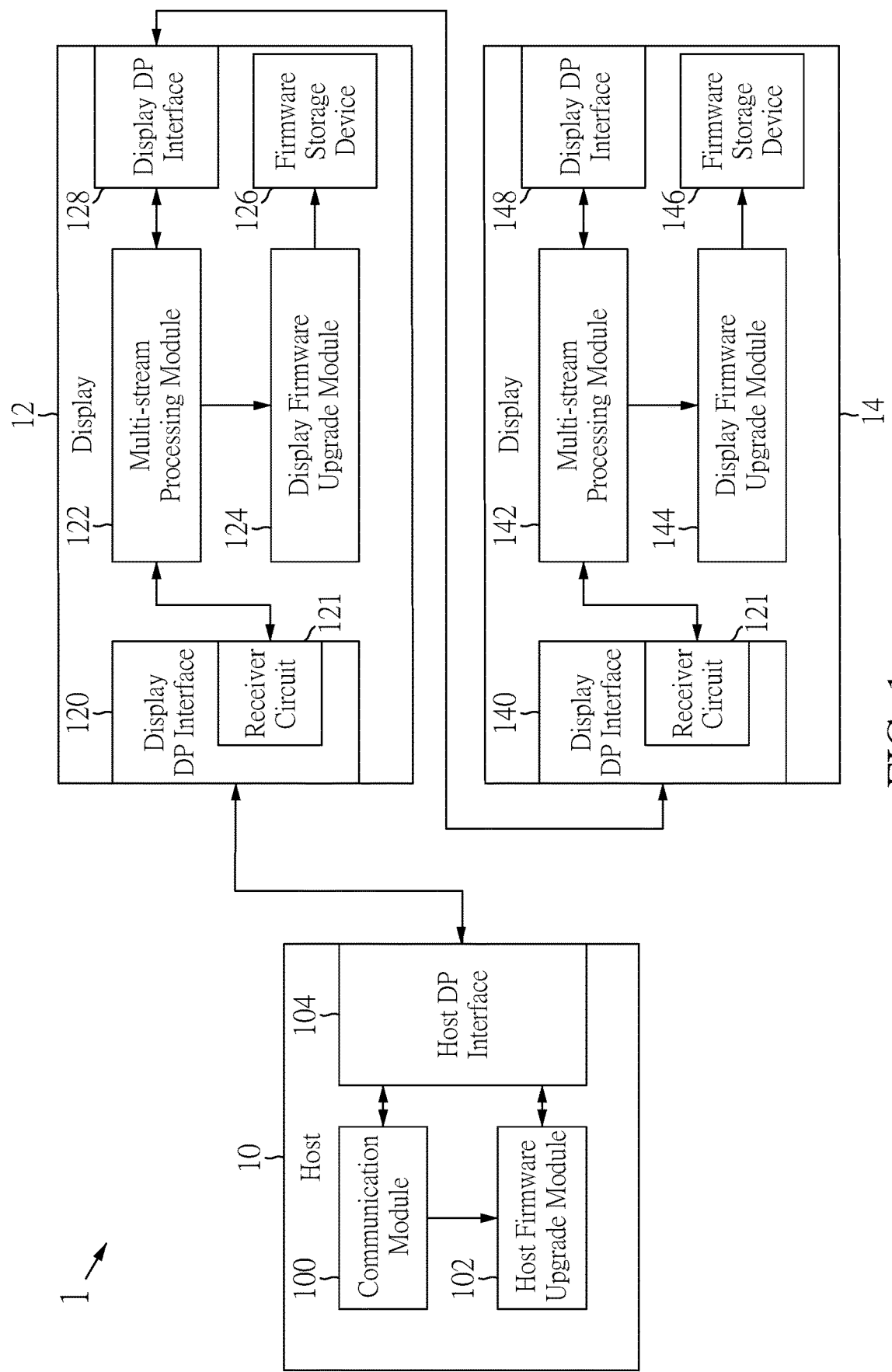
FIG. 1 is a functional block diagram of a firmware upgrade system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

FIG. 1 is a functional block diagram of a firmware upgrade system according to a first embodiment of the present disclosure, in which a firmware upgrade system 1 based on a multi-stream transport (MST) mode of DisplayPort (DP) interface is shown, and the firmware upgrade system 1 includes a plurality of displays 12, 14 and a host 10.

The host 10 and the displays 12 and 14 are connected in series in a daisy chain topology, and the host 10 includes a communication module 100 and a host firmware upgrade module 102. The communication module 100 is connected to a host DP interface 104 and is configured to obtain a plurality of records of firmware information of the displays 12 and 14 through a DP auxiliary channel.

In detail, the MST under the DP interface standard allows daisy chaining of displays, that is, connecting a series of displays to a host 10, such as a computer. After enabling MST function of a graphics card of the computer and DP function of the displays, the computer is connected to a DP input of a first display in the daisy chain topology, and a DP output of the first display is connected to a DP input of a second display, and so on.

The communication module 100 can be configured to establish a DP interface link with the displays 12 and 14, obtain control rights and interface parameters of all auxiliary channels of the DP interface, and determine a specific structure of the daisy chain topology, for example, models, quantity and addresses of all devices in this topology.

The host firmware upgrade module 102 can select at least one of the displays 12 and 14 as a target display for firmware upgrade according to the plurality of records of firmware information of the displays 12 and 14, and can transmit a firmware for upgrading through a host DP interface 104 to the displays 12 and 14 for firmware upgrade.

It should be noted that the host DP interface 104 includes a data transmission main link, an auxiliary channel (Aux Channel) and a link training. The auxiliary channel is an independent two-way half-duplex transmission auxiliary channel, which is used to transmit setting and control commands.

On the other hand, the display 12 includes a receiver circuit 121, a multi-stream processing module 122, a display firmware upgrade module 124 and a firmware storage device 126, and the display 14 includes a receiver circuit 141, a multi-stream processing module 142, a display firmware upgrade module 144 and a firmware storage device 146. Since the display 12 basically has the same structure as the display 14, details thereof will not be further described herein.

The receiver circuit 121 is connected between the display DP interface 120 and the multi-stream processing module 122, and is configured to receive data transmitted through the data transmission main link, the auxiliary channel and the link training of the display DP interface 120. The receiver circuit 121 can be, for example, a DP receiver, including a first-in-first-out (FIFO) buffer.

A main purpose of the multi-stream processing module 122 in the first embodiment of the present disclosure is that it can analyze a sideband message in the auxiliary channel of the DP interface, and determine, according to a total link count in the sideband message (Link_Count_Total value, referred to as LCT) and a remaining link count (Link_Count_Remaining value, referred to as LCR), whether to transfer this message to a next level display. In addition, the multi-stream processing module 122 can also determine whether to perform firmware upgrade according to a special data segment in the sideband message body, and to reorganize the sideband message used to indicate whether the firmware upgrade is successful, so as to notify the host 10 whether the firmware upgrade is successful.

The display firmware upgrade module 124 is connected to the multi-stream processing module 122 and the firmware storage device 126 for storing firmware. The display firmware upgrade module 124 can be configured to write firmware data into the firmware storage device 126.

Figure 2:
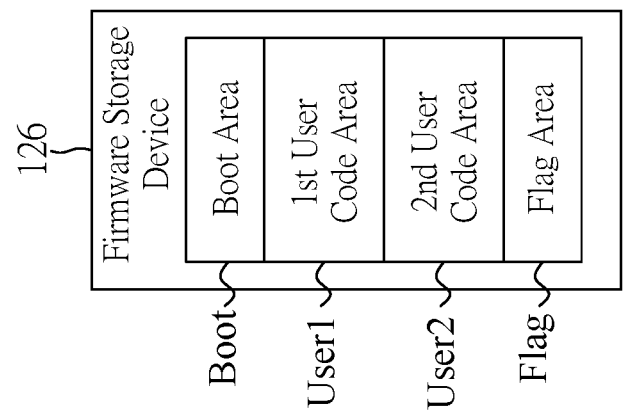
FIG. 2 is a functional block diagram of a firmware storage device according to the first embodiment of the present disclosure.

Reference is made to FIG. 2, which is a functional block diagram of a firmware storage device according to the first embodiment of the present disclosure. The firmware storage device 126 is mainly used for storing firmware, and includes a boot area Boot, a first user code area User1, a second user code area User2 and a flag area Flag. The boot area Boot stores a boot program A, the first user code area User1 and the second user code area User2 store initial firmware B1 and B2, respectively, one of which is used as a firmware execution area for storing a firmware file that executes normally, and the other is used as a firmware backup area for backup and waiting for firmware upgrade. For example, when the first user code area User1 is used as the firmware execution area, new firmware data are written to the second user code area User2 as the firmware backup area during the firmware upgrade. After the upgrade is completed, the display reboots and starts from the boot area Boot, the boot program A starts the display from the second user code area User2 according to information in the flag area Flag, and sets the first user code area User1 as the backup area.

Figure 3:
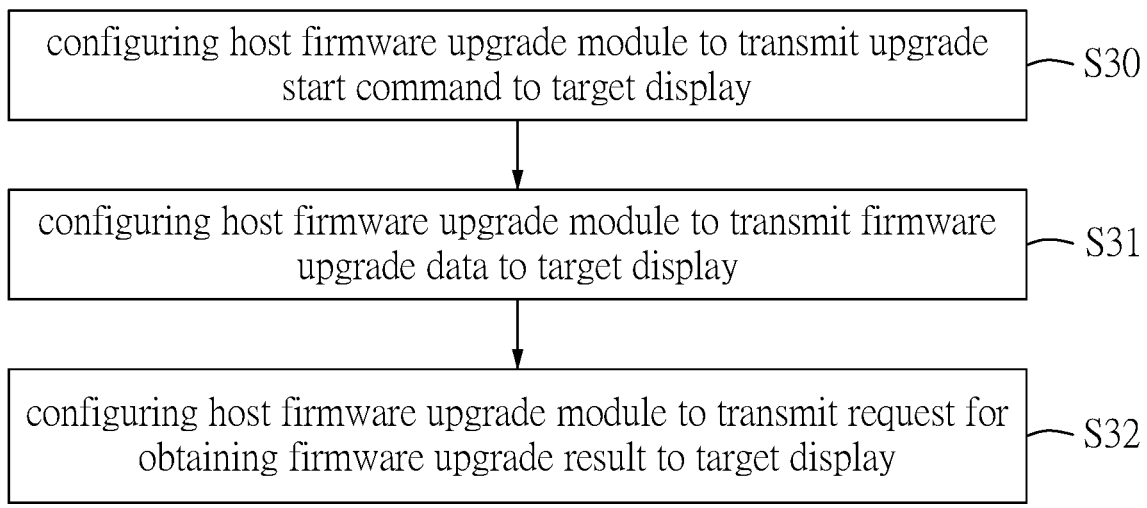
FIG. 3 is a first flowchart of a firmware upgrade method according to the first embodiment of the present disclosure.

Referring to FIG. 3, which is a first flowchart of a firmware upgrade method according to the first embodiment of the present disclosure. In the first embodiment, the host firmware upgrade module 102 can select the display 14 as the target display for firmware upgrade according to firmware information of the displays 12 and 14. Under this premise, the host 10 and the displays 12 and 14 are configured to perform a firmware upgrade process. The first flowchart shows steps performed on the host, and the firmware upgrade process includes:

Step S30: configuring the host firmware upgrade module to transmit an upgrade start command to the target display. For example, the host firmware upgrade module 102 can include an upgrade start command in a sideband message, and transmit the sideband message through the DP auxiliary channel, the destination of which is the display 14. The sideband message can include a message header and a message body, and can be, for example, REMOTE_I2C_WRITE Request in a sideband message type, the purpose of which is to instruct the target display to start preparing for firmware upgrade. The message header includes the aforementioned total link count (Link_Count_Total value, referred to as LCT) and the remaining link count (Link_Count_Remaining value, referred to as LCR), where the LCT is defined as the total number of DP links that sideband messages will pass through along the path from host 10 to the target display, the LCR is defined as the remaining number of DP links traversed by sideband messages along the path to the target display. In addition, the message header also includes information such as Sideband_MSG_Body_Length that describes a length of the message body.

Step S31: configuring the host firmware upgrade module to transmit firmware upgrade data to the target display. Similarly, the host firmware upgrade module 102 can include the firmware upgrade data in the sideband message, and also use the REMOTE_I2C_WRITE Request type sideband message to send the firmware upgrade data to the target display, and transmit the firmware upgrade data through the DP auxiliary channel, the destination of which is the display 14.

Step S32: configuring the host firmware upgrade module to transmit a request for obtaining a firmware upgrade result to the target display. Similarly, this step is to confirm, from the target display, whether the firmware upgrade is completed after the firmware upgrade data is transmitted. Therefore, setting values in the LCT and LCR are the same as the previous steps, the difference being that this step is to obtain information on whether or not the firmware upgrade is successful through the sideband message of the REMOTE_I2C_READ Request type.

Figure 4:
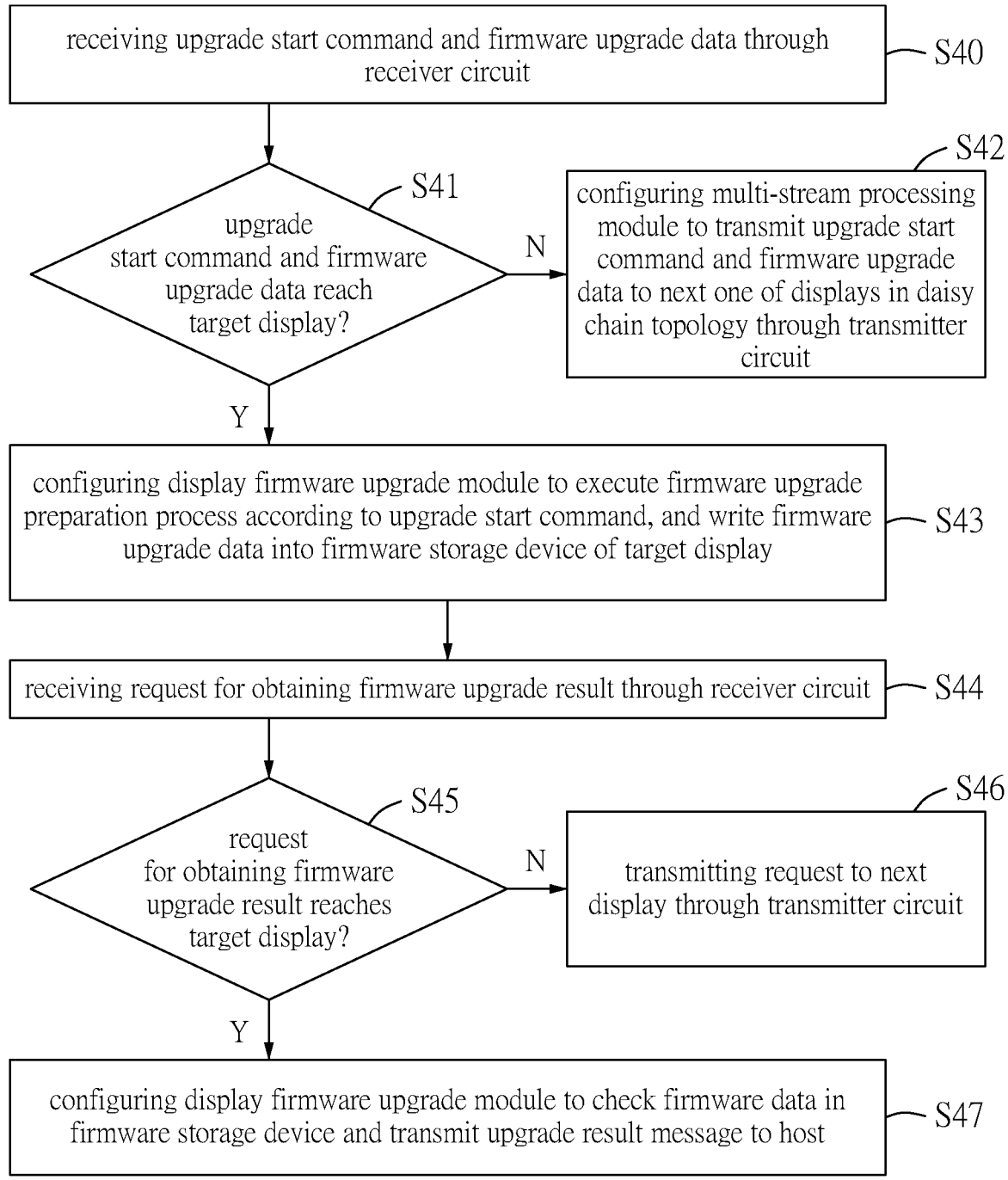
FIG. 4 is a second flowchart of the firmware upgrade method according to the first embodiment of the present disclosure.

Reference is made to FIG. 4, which is a second flowchart of the firmware upgrade method according to the first embodiment of the present disclosure. Here, the second flowchart shows steps performed by the firmware upgrade process on display ends in a downstream direction. As shown in FIG. 4, the firmware upgrade procedure includes configuring each of the displays 12, 14 to perform the following steps:

Step S40: receiving the upgrade start command and the firmware upgrade data through the receiver circuit. In the present embodiment, in response to detecting the sideband message, the receiver circuit 121 of the display device 12 receives the data into the FIFO buffer, and sets a flag Msg_rcv_finish to 1 to indicate that the sideband message is received.

Step S41: configuring a multi-stream processing module to determine whether the upgrade start command and the firmware upgrade data reach the target display. In detail, in response to the multi-stream processing module 122 detecting that the flag Msg_rcv_finish is 1, the multi-stream processing module 122 reads data from the FIFO buffer, analyzes the LCT and the LCR in the message header of the sideband message, and determines whether the LCR is a predetermined value, that is, 0. In response to determining that the LCR is not the predetermined value (0), it is determined that the sideband message has not yet reached the target display.

In response to determining that the upgrade start command and the firmware upgrade data do not reach the target display, the firmware upgrade process proceeds to step S42: configuring the multi-stream processing module to transmit the upgrade start command and the firmware upgrade data to next one of the displays in the daisy chain topology through the transmitter circuit. For example, the multi-stream processing module 122 can modify the LCR value in the message header to LCR-1, and then transmit the reassembled sideband message to the next display device 14 through the transmitter circuit and the display DP interface 128.

In response to determining that the upgrade start command and the firmware upgrade data reach the target display, the firmware upgrade process proceeds to step S43: configuring the display firmware upgrade module to execute a firmware upgrade preparation process according to the upgrade start command, and write the firmware upgrade data into a firmware storage device of the target display.

For example, in response to determining that the LCR is the predetermined value (0), it is determined that the sideband message reaches the target display. For example, when reaching the display 14, the above steps S40 and S41 are also performed, and the multi-stream processing module 142 will determine that the LCR is 0, and further analyze the message body of the sideband message. In the previous steps, since the sideband message of the REMOTE_I2C_WRITE Request type is used when the host 10 transmits the sideband message, and the start upgrade command and the firmware upgrade data are respectively included in the message body of the sideband message, therefore, in step S43, the multi-stream processing module 142 analyzes the message body, and when the message body is analyzed and found to be the sideband message of the REMOTE_I2C_WRITE Request type, the multi-stream processing module 142 further analyzes the message body to obtain the write identification code, for example, Write_I2C_Device_Identifier. If the data segment corresponding to the identifier, for example, a field is a defined specific value (for example, 0x94), the data corresponding to I2C_Data_To_Write in the message body is then sent to the display firmware upgrade module 144.

Next, the display firmware upgrade module is configured to determine whether the data segment corresponds to the upgrade start command or the firmware upgrade data according to the data segment, e.g., a first byte in the data corresponding to I2C_Data_To_Write. If the data segment corresponds to the upgrade start command, the firmware upgrade preparation process is executed according to the upgrade start command. If the data segment corresponds to firmware upgrade data, the firmware upgrade data is written into the firmware storage device 146 of the target display (e.g., display 14).

Step S44: receiving the request for obtaining the firmware upgrade result through the receiver circuit.

Step S45: configuring the multi-stream processing module to determine whether the request for obtaining the firmware upgrade result reaches the target display. In this step, the request for obtaining the firmware upgrade result is also sent through the sideband message, so that details in connection with determining whether the request reaches the target display will not be repeated herein.

In response to determining that the request for obtaining the firmware upgrade result does not reach the target display, the firmware upgrade process proceeds to step S46: transmitting the request to the next display through the transmitter circuit. Similarly, in response to determining that the LCR is not the predetermined value (0), it is determined that the sideband message has not yet reached the target display, and the multi-stream processing module 122 can modify the LCR value in the message header to LCR-1, and then transmit, through transmitter circuit and the display DP interface 128, the reassembled sideband message to the next display device 14.

In response to determining that the request for obtaining the firmware upgrade result reaches the target display, the firmware upgrade process proceeds to step S47: configuring the display firmware upgrade module to check firmware data in the firmware storage device and transmit an upgrade result message to the host.

In this step, the multi-stream processing module 142 determines that the LCR is 0, and further analyzes the message body of the sideband message. In the previous steps, since the sideband message of the REMOTE_I2C_READ Request type is used when the host 10 transmits the sideband message, and the request for obtaining the firmware upgrade result is included in the message body of the sideband message, therefore, in step S45, the multi-stream processing module 142 analyzes the message body, and when the message body is analyzed and found to be the sideband message of the REMOTE_I2C_READ Request type, the multi-stream processing module 142 analyzes the message body to obtain the read identification code, for example, Read_I2C_Device_Identifier, and further analyzes a first byte of the data corresponding to identifier to determine that the data segment corresponds to the request for obtaining the firmware upgrade result.

Next, the display firmware upgrade module 144 is notified, and the display firmware upgrade module 144 checks the legality of the firmware data written in the firmware storage device 146, for example, by CRC or digital signature authentication, and returns the upgrade result that indicates success or failure to the host 10 through a REMOTE_I2C_READ Replay message. It should be noted that concepts of an upstream process and the downstream processes are basically the same. The upstream process includes the upgrade result message in the message body of the sideband message, and sets the LCT and LCR in the message header in a similar way. The sideband messages are also reassembled by the displays on the path after modifying the LCR until reaching the host 10. Therefore, details of the upstream process are not repeated here.

In some embodiments, if all the displays in the daisy chain topology are of the same model, the firmware versions of all the displays are the same, and the firmware upgrade data of the host 10 needs to be used for firmware upgrade, then the firmware upgrade method provided by the present disclosure can realize simultaneous firmware upgrading for all displays on the link.

Figure 5:
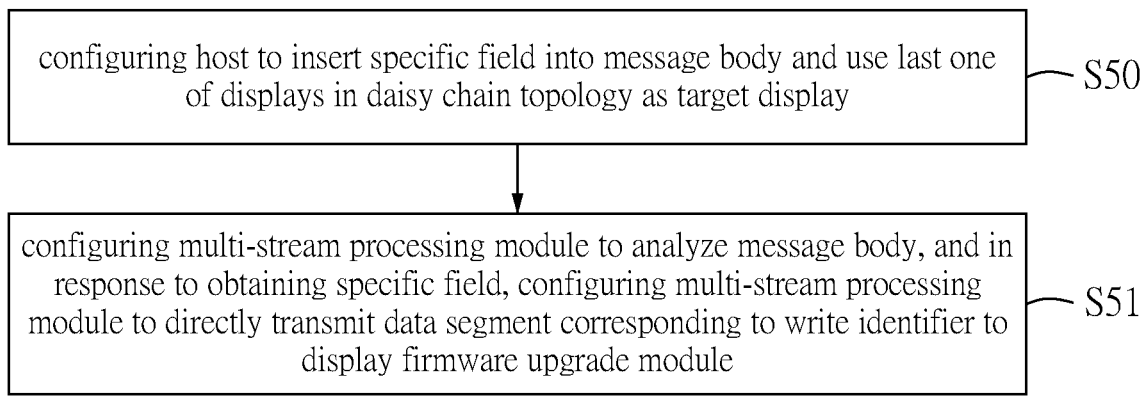
FIG. 5 is a third flowchart of the firmware upgrade method according to the first embodiment of the present disclosure.

Referring to FIG. 5, which is a third flowchart of the firmware upgrade method according to the first embodiment of the present disclosure. In the first embodiment, if the host 10 determines that the target display needs to include all displays according to the firmware information, the following steps are further performed:

Step S50: configuring the host to insert a specific field into the message body and use a last one of the plurality of displays in the daisy chain topology as the target display.

For example, the host firmware upgrade module 102 can use the message body of the REMOTE_I2C_WRITE Request type. In addition to setting the field corresponding to Write_I2C_Device_Identifier in the message body to the field indicating firmware upgrade (e.g., 0x94), the host firmware upgrade module 102 also sets a specific field in the data corresponding to I2C_Data_To_Write in the message body, such as first and second bytes, as specific values, such as 0x01 and 0x00, respectively.

Step S51: configuring the multi-stream processing module to analyze the message body, and in response to obtaining the specific field, configuring the multi-stream processing module to directly transmit the data segment corresponding to the write identifier to the display firmware upgrade module.

For example, when the sideband message reaches the display 12, the multi-stream processing module 122 first determines that the sideband message needs to continue to be transmitted to the next display 14, so that the multi-stream processing module 122 reduces the LCR by 1, then reassembles the sideband message and send the sideband message down. At the same time, when the multi-stream processing module 122 analyzes the message body of the sideband message, the multi-stream processing module 122 obtains that, in the data corresponding to I2C_Data_To_Write in the message body, the first and second bytes are 0x01 and 0x00. Then, it is determined that the firmware upgrade is required, and the data segment is directly transmitted to the display firmware upgrade module 124. Similar to step S43, if the data segment corresponds to the upgrade start command, the firmware upgrade preparation process is executed according to the upgrade start command. If the data segment corresponds to firmware upgrade data, it is written into the firmware storage device 126 of the display (e.g., the display 12).

Therefore, in the first embodiment, based on the MST function under the DP standard, the firmware of any display on the MST link of the DP interface is upgraded through the sideband message of the auxiliary channel of the DP interface, or simultaneous firmware upgrade for all monitors on the link can be performed. Therefore, the cost of firmware upgrade can be reduced, and the efficiency of firmware upgrade can be improved.

Second Embodiment

Figure 6:
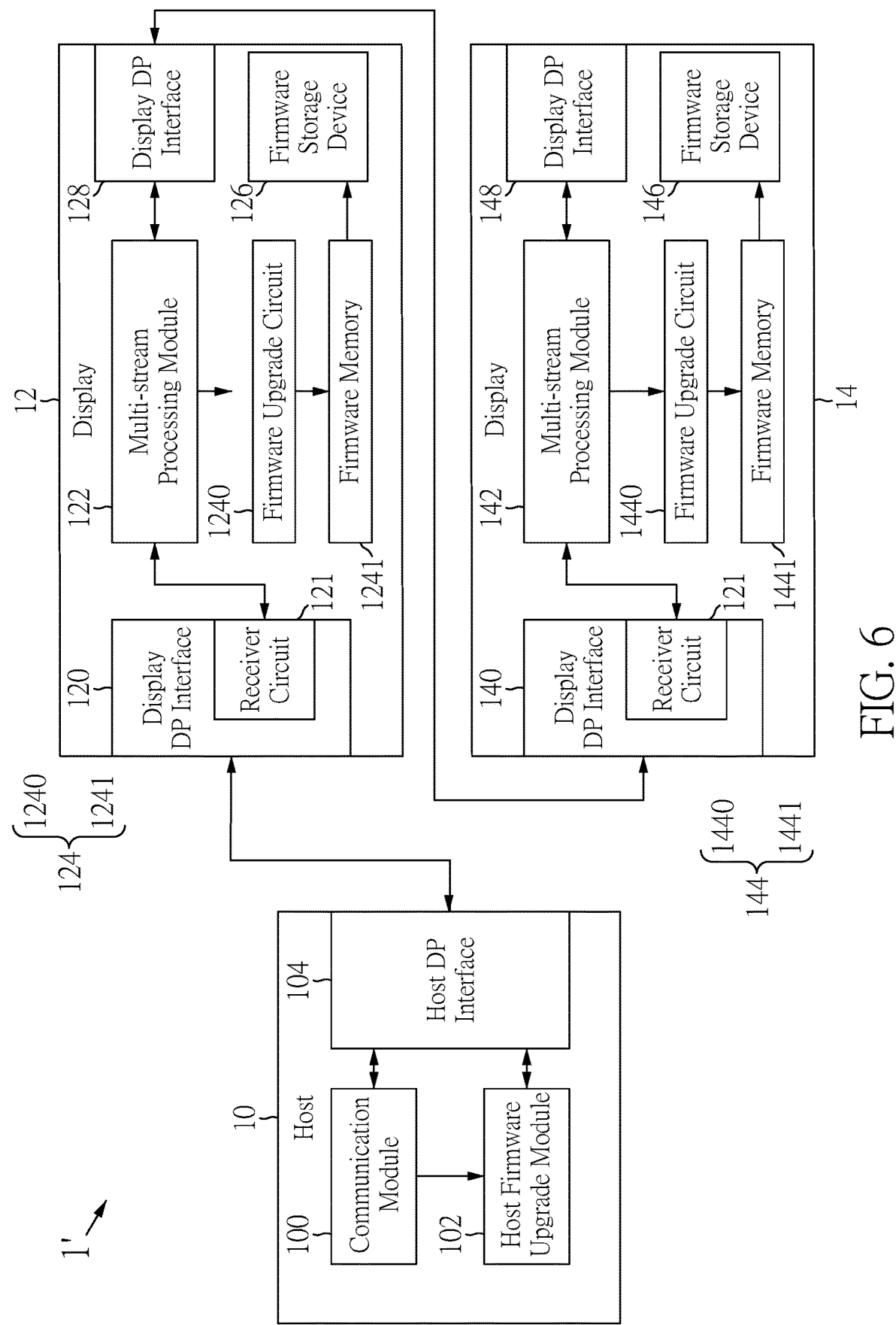
FIG. 6 is a functional block diagram of a firmware upgrade system according to a second embodiment of the present disclosure.

FIG. 6 is a functional block diagram of a firmware upgrade system according to a second embodiment of the present disclosure. In the second embodiment, in order to further improve the speed of firmware upgrade, when the firmware upgrade needs to be performed, in addition to using the DP auxiliary channel to transmit the sideband message, the host 10 further utilizes the DP main link to transmit the firmware upgrade data to the target display in the form of a secondary data packet (SDP).

As shown in FIG. 6, a structure of the firmware upgrade system 1' is different from the firmware upgrade system 1 in FIG. 1 in that the display firmware upgrade module 124 includes a firmware upgrade circuit 1240 and a firmware memory 1241, and the display firmware upgrade module 144 includes a firmware upgrade circuit 1440 and a firmware memory 1441.

Figure 7:
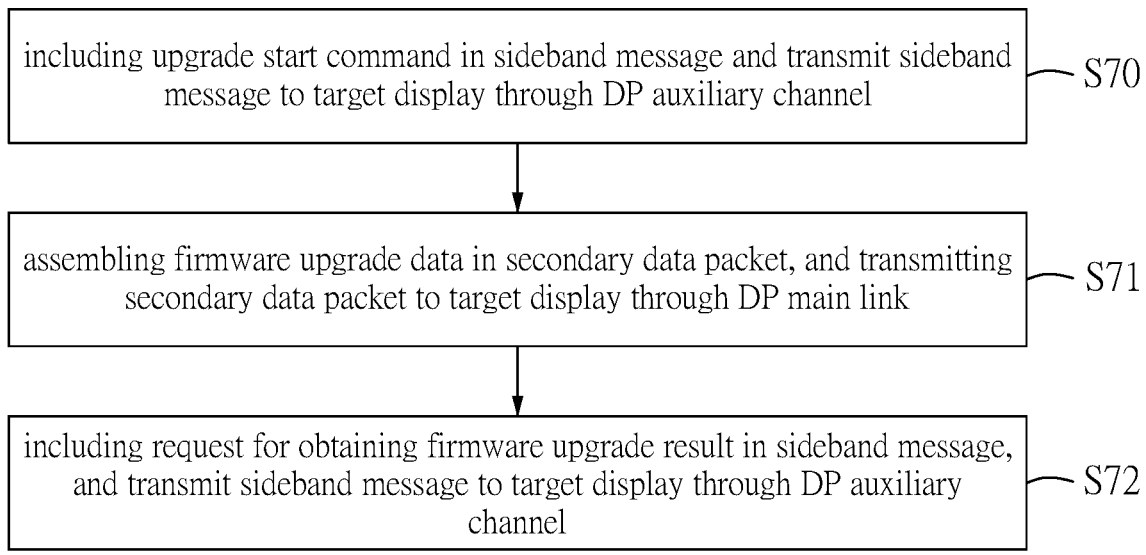
FIG. 7 is a first flowchart of a firmware upgrade method according to the second embodiment of the present disclosure.

Based on the structure of FIG. 6 and a flow of FIG. 3, reference is made to FIG. 7, which is a first flowchart of a firmware upgrade method according to the second embodiment of the present disclosure.

On the host side, the firmware upgrade method also includes the following steps:

Step S70: including the upgrade start command in the sideband message and transmit the sideband message to the target display through the DP auxiliary channel.

Step S71: assembling the firmware upgrade data in the secondary data packet, and transmitting the secondary data packet to the target display through the DP main link. In the DP specification, the SDP is generally used to transmit an audio signal, and the present disclosure further utilizes the SDP to transmit the firmware upgrade data.

Step S72: including the request for obtaining the firmware upgrade result in the sideband message, and transmit the sideband message to the target display through the DP auxiliary channel.

Figure 8:
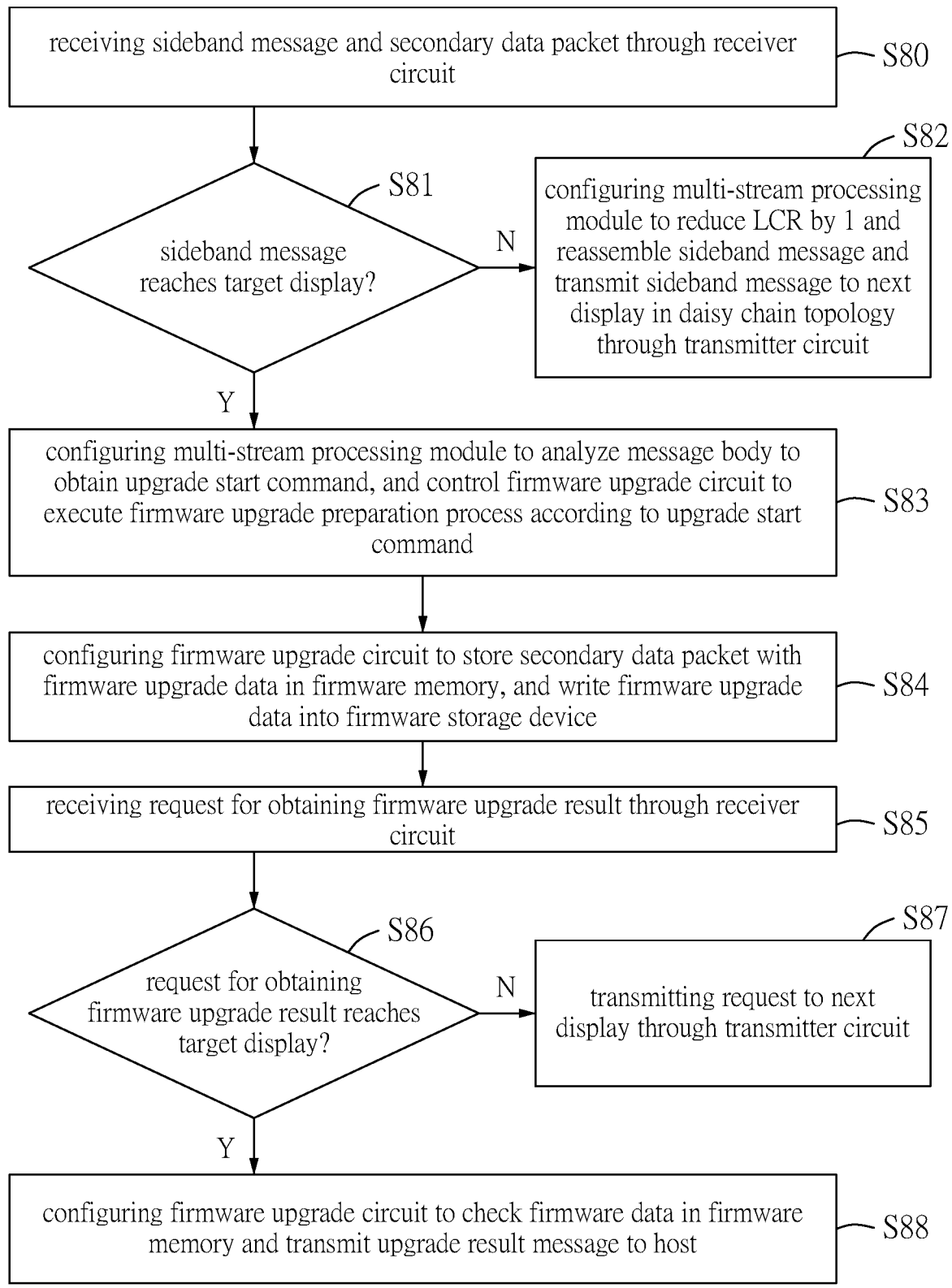
FIG. 8 is a second flowchart of the firmware upgrade method according to the second embodiment of the present disclosure.

Based on the structure of FIG. 6 and a flow of FIG. 3, reference is made to FIG. 8, which is a second flowchart of a firmware upgrade method according to the second embodiment of the present disclosure.

On the display side, the firmware upgrade process can include performing the following steps for all displays:

Step S80: receiving the sideband message and the secondary data packet through the receiver circuit. The method through which the sideband message is received will not be repeated again, but for the secondary data packet, when the receiver circuit 121 of the display 12 at a first stage receives data on the DP main link, data belonging to the display 14 (including the secondary data packet) is accepted, and other data are transmitted to the next-level display 14 through the DP main link.

Step S81: determining whether the sideband message reaches the target display.

In response to determining that the sideband message reaches the target display, the firmware upgrade process to step S82: configuring the multi-stream processing module to reduce the LCR by 1 and reassemble the sideband message and transmit the sideband message to the next display in the daisy chain topology through the transmitter circuit.

In response to determining that the sideband message reaches the target display, the firmware upgrade process proceeds to step S83: configuring the multi-stream processing module to analyze the message body to obtain the upgrade start command, and control the firmware upgrade circuit to execute the firmware upgrade preparation process according to the upgrade start command.

Step S84: configuring the firmware upgrade circuit to store the secondary data packet with the firmware upgrade data in the firmware memory, and write the firmware upgrade data into the firmware storage device.

Specifically, when the target display, for example, the display 14 receives a specific SDP, the firmware upgrade circuit 1440 directly stores the firmware upgrade data in the SDP into the firmware memory, for example, a random access memory (RAM), which can include, for example, RAM units with 2*256 bytes for data storage. When one of the RAM units is full of 256 bytes of firmware upgrade data, the firmware upgrade data is written to the firmware storage device, and the subsequently received firmware upgrade data is stored in the other RAM unit. The two RAM units can be used alternately to ensure uninterrupted writes.

If all the displays in the daisy chain topology are of the same model and the firmware versions of all the monitors are the same and need to be upgraded by the firmware upgrade data of the host 10, in the second embodiment, the firmware upgrade method can also realize the firmware upgrade of all displays on the link at the same time.

Figure 9:
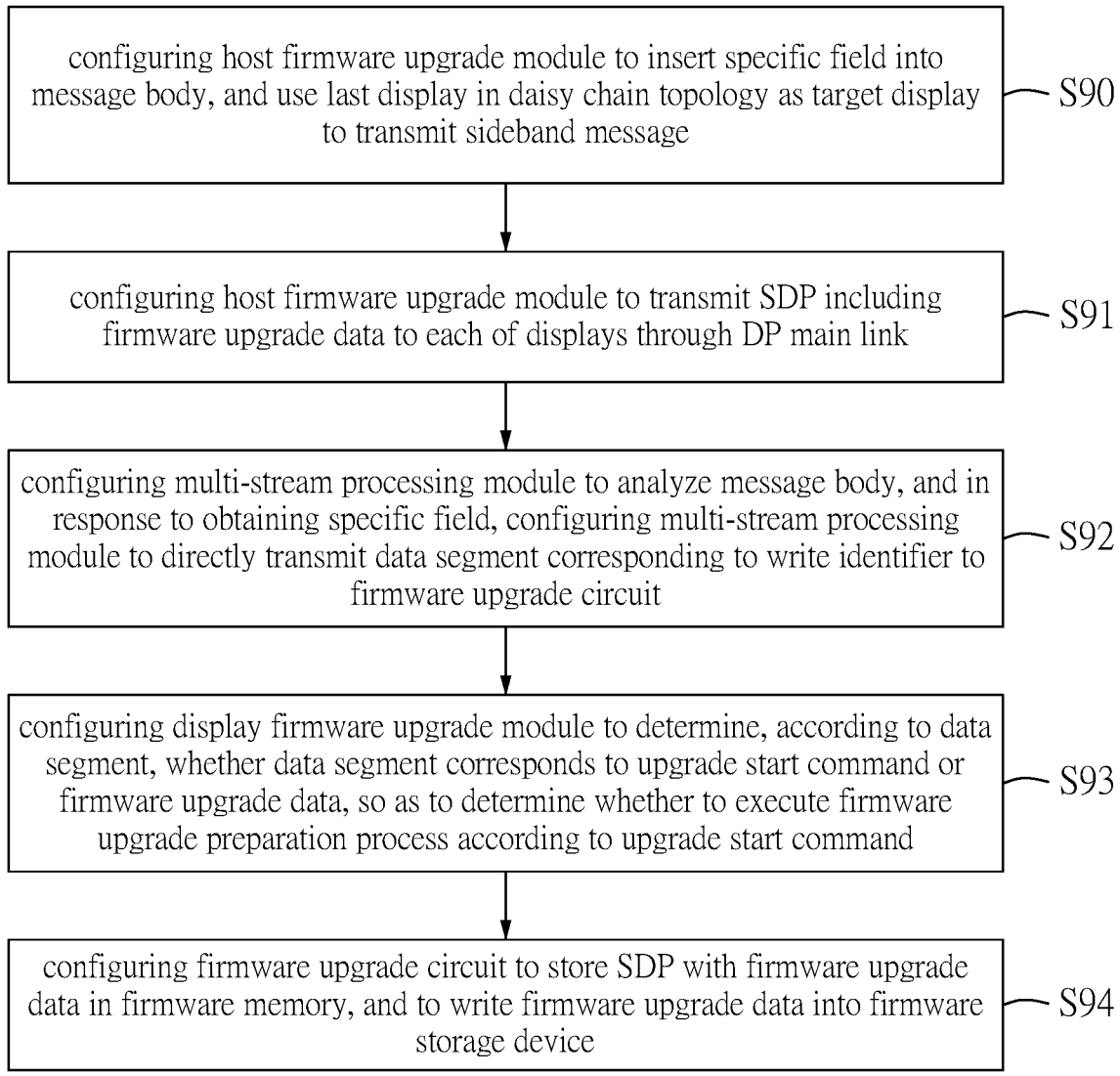
FIG. 9 is a third flowchart of the firmware upgrade method according to the second embodiment of the present disclosure.

Referring to FIG. 9, which is a third flowchart of the firmware upgrade method according to the second embodiment of the present disclosure. As shown in FIG. 9, when the host firmware upgrade module determines that the target display needs to include all displays, the firmware upgrade process further includes the following steps:

Step S90: configuring the host firmware upgrade module to insert a specific field into the message body, and use the last display in the daisy chain topology as the target display to transmit the sideband message. It should be noted that, in the present embodiment, only the firmware upgrade command is included in the sideband message for data transmission, and the sideband message does not include the firmware upgrade data.

Step S91: configuring the host firmware upgrade module to transmit the SDP including the firmware upgrade data to each of the plurality of displays through the DP main link.

Step S92: configuring the multi-stream processing module to analyze the message body, and in response to obtaining the specific field, configuring the multi-stream processing module to directly transmit the data segment corresponding to the write identifier to the firmware upgrade circuit.

Step S93: configuring the display firmware upgrade module to determine, according to the data segment, whether the data segment corresponds to the upgrade start command or the firmware upgrade data, so as to determine whether to execute the firmware upgrade preparation process according to the upgrade start command. Here, steps S92 and S93 are similar to the related descriptions in step S51, so that details thereof are not repeated herein.

In response to the firmware upgrade preparation process being executed, the firmware upgrade process proceeds to step S94: configuring the firmware upgrade circuit to store the SDP with the firmware upgrade data in the firmware memory, and to write the firmware upgrade data into the firmware storage device.

For example, when the multi-data stream processing module 122 analyzes the message body of the sideband message, it can obtain that in the data corresponding to I2C_Data_To_Write in the message body, the first and second bytes are 0x01 and 0x00, then it is determined that the firmware upgrade is to be performed, the data segment is directly sent to the firmware upgrade circuit 1240. The firmware upgrade circuit 1240 determines that the data segment corresponds to the upgrade start command, and directly writes the firmware upgrade data in the firmware memory 1241 into the firmware in storage device 126.

It should be noted that, the firmware upgrade preparation process mentioned in the first embodiment and the second embodiment can be, for example, steps of waking up a display that is sleeping, and initializing the firmware upgrade module of a display that is in operation. However, according to a configuration of the firmware storage device in FIG. 2, the display can still perform the firmware upgrade process under normal operating conditions.

Next, further referring to FIG. 8, the firmware upgrade process of the second embodiment of the present disclosure proceeds to step S85.

Step S85: receiving the request for obtaining the firmware upgrade result through the receiver circuit.

Step S86: configuring the multi-stream processing module to determine whether the request for obtaining the firmware upgrade result reaches the target display. In this step, the request for obtaining the firmware upgrade result is also sent through the sideband message, so that the details regarding the determination of whether the request reaches the target display will not be repeated herein.

In response to determining that the request for obtaining the firmware upgrade result does not reach the target display, the firmware upgrade process proceeds to step S87: transmitting the request to the next display through the transmitter circuit.

In response to determining that the request for obtaining the firmware upgrade result reaches the target display, the firmware upgrade process proceeds to step S88: configuring the firmware upgrade circuit to check firmware data in the firmware memory and transmit the upgrade result message to the host.

Beneficial Effects of the Embodiments

In conclusion, in the firmware upgrade method and the firmware upgrade system provided by the present disclosure, based on MST functions under DP standards, the sideband message of an auxiliary channel of the DP interface or a secondary data packet (SDP) of the main link of the DP interface can be utilized to upgrade the firmware of any display on an MST link of the DP interface, or to upgrade the firmware of all displays on the MST link at the same time. Therefore, the costs associated with firmware upgrading can be reduced, and the efficiency of firmware upgrading can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A firmware upgrade method based on a multi-stream transport mode of a DisplayPort (DP) interface, suitable for a plurality of displays and a host connected in a daisy chain topology, the firmware upgrade method comprising:
    configuring a communication module of the host to obtain a plurality of records of firmware information of the plurality of displays through a DP auxiliary channel of a host DP interface, and to select a target display of the plurality of displays for firmware upgrade;

performing a firmware upgrade process, including:
configuring a host firmware upgrade module of the host to transmit an upgrade start command and firmware upgrade data to the target display;
configuring each of the plurality of displays to:
receive the upgrade start command and the firmware upgrade data from a display DP interface through a receiver circuit;
configure a multi-stream processing module to determine whether the upgrade start command and the firmware upgrade data reach the target display;
in response to determining that the upgrade start command and the firmware upgrade data do not reach the target display, configure the multi-stream processing module to transmit the upgrade start command and the firmware upgrade data to a next one of the displays in the daisy chain topology through the transmitter circuit; and
in response to determining that the upgrade start command and the firmware upgrade data reach the target display, configure a display firmware upgrade module to execute a firmware upgrade preparation process according to the upgrade start command, and write the firmware upgrade data to a firmware storage device of the target display;
configuring the host firmware upgrade module of the host to transmit a request for obtaining a firmware upgrade result to the target display; and
configuring each of the plurality of displays to:
receive the request for obtaining the firmware upgrade result through the receiver circuit;
configure the multi-stream processing module to determine whether the request for obtaining the firmware upgrade result reaches the target display;
in response to determining that the request for obtaining the firmware upgrade result does not reach the target display, transmit the request to the next display through the transmitter circuit; and
in response to determining that the request for obtaining the firmware upgrade result reaches the target display, configure the display firmware upgrade module to check firmware data in the firmware storage device and transmit an upgrade result message to the host;
configuring the host to include the upgrade start command and the firmware upgrade data in a sideband message, and to transmit the sideband message through the DP auxiliary channel, wherein the sideband message includes a message header and a message body,
wherein the step of determining whether the upgrade start command and the firmware upgrade data reach the target display further includes configuring the multi-stream processing module to analyze the message header to obtain a total link count and a remaining link count, and determine whether the remaining link count is a predetermined value; and
configuring the display firmware upgrade module to determine, according to data segment from the multi-stream processing module, whether the data segment corresponds to the upgrade start command or the firmware upgrade data, so as to determine whether to execute the firmware upgrade preparation process according to the upgrade start command, or to write the firmware data into the firmware storage device of the target display.

2. The firmware upgrade method according to claim 1, wherein,
in response to determining that the remaining link count is not the predetermined value, determine that the sideband message does not reach the target display, subtract 1 from the remaining link count and recombining the remaining link count into the sideband message; and
in response to determining that the remaining link count is the predetermined value, determine that the sideband message reaches the target display.

3. The firmware upgrade method according to claim 2, further comprising:
in response to determining that the sideband message reaches the target display, configuring the multi-stream processing module to analyze the message body to obtain a write identifier, and to transmit the corresponding data segment to the display firmware upgrade module according to the write identifier.

4. The firmware upgrade method according to claim 3, further comprising:
in response to the selected target display needing to include all of the plurality of displays, configuring the host to insert a specific field into the message body and use a last one of the plurality of displays in the daisy chain topology as the target display;
configuring the multi-stream processing module to analyze the message body, and in response to obtaining the specific field, configuring the multi-stream processing module to directly transmit the data segment corresponding to the write identifier to the display firmware upgrade module.

5. The firmware upgrade method according to claim 4, further comprising:
configuring the display firmware upgrade module to determine, according to the data segment, whether the data segment corresponds to the upgrade start command or the firmware upgrade data, so as to determine whether to execute the firmware upgrade preparation process according to the upgrade start command, or to write the firmware data into the firmware storage device of the target display.

6. The firmware upgrade method according to claim 1, further comprising configuring the host to:
include the upgrade start command in a sideband message, and transmit the sideband message through the DP auxiliary channel, wherein the sideband message includes a message header and a message body; and
assemble the firmware upgrade data in a secondary data packet (SDP) and transmit the SDP to the target display through a DP main link.

7. The firmware upgrade method according to claim 6, wherein the step of determining whether the upgrade start command and the firmware upgrade data reach the target display further includes configuring the multi-stream processing module to:
analyze the message header to obtain a total link count and a remaining link count, and determine whether the remaining link count is a predetermined value;
in response to determining that the remaining link count is not the predetermined value, determine that the sideband message does not reach the target display, subtract 1 from the remaining link count and recombine the remaining link count into the sideband message, and send the sideband message to next one of the displays in the daisy chain topology; and
in response to determining that the remaining link count is the predetermined value, determine that the sideband message reaches the target display.

8. The firmware upgrade method according to claim 6, wherein the display firmware upgrade module includes a firmware upgrade circuit and a firmware memory, and the firmware upgrade method further comprises:
   in response to determining that the sideband message reaches the target display, configuring the multi-stream processing module to analyze the message body to obtain the upgrade start command, and to control the firmware upgrade circuit to execute the firmware upgrade preparation process according to the upgrade start command; and
   in response to determining that the upgrade start command reaches the target display, configuring the firmware upgrade circuit to store the data packet having the firmware upgrade data in the firmware memory, and write the firmware upgrade data into the firmware storage device.

9. The firmware upgrade method according to claim 8, further comprising:
   in response to the selected target display needing to include all of the plurality of displays, configuring the host to insert a specific field into the message body and use a last one of the plurality of display in the daisy chain topology as the target display, so as to transmit the sideband message;
   configuring the host to transmit the SDP to each of the plurality of displays through the DP main link;
   configuring the multi-stream processing module to analyze the message body, and in response to obtaining the specific field, configuring the multi-stream processing module to directly transmit the data segment corresponding to the write identifier to the firmware upgrade circuit; and
   in response to the firmware upgrade preparation process being executed, configuring the firmware upgrade circuit to store the SDP with the firmware upgrade data in the firmware memory, and to write the firmware upgrade data into the firmware storage device.

10. A firmware upgrade system based on a multi-stream transport mode of a DisplayPort (DP) interface, the firmware upgrade system comprising:
   a plurality of displays each including:
   a receiver circuit connected to a display DP interface;
   a multi-stream processing module connected to the receiver circuit;
   a display firmware upgrade module connected to the multi-stream processing module; and
   a firmware storage device configured to store a firmware;
   a host connected in series with the displays in a daisy chain topology, wherein the host includes:
   a communication module connected to a host DP interface, wherein the communication module is configured to obtain a plurality of records of firmware information of the plurality of displays through a DP auxiliary channel;
   a host firmware upgrade module configured to select a target display of the plurality of displays for firmware upgrade,
   wherein the host and the plurality of displays are configured to execute a firmware upgrade process, including:
   configuring the host firmware upgrade module to transmit an upgrade start command and firmware upgrade data to the target display;
   configuring each of the plurality of displays to:
   receive the upgrade start command and the firmware upgrade data through the receiver circuit;
   configure the multi-stream processing module to determine whether the upgrade start command and the firmware upgrade data reach the target display;
   in response to determining that the upgrade start command and the firmware upgrade data do not reach the target display, configure the multi-stream processing module to transmit the upgrade start command and the firmware upgrade data to a next one of the displays in the daisy chain topology through the transmitter circuit; and
   in response to determining that the upgrade start command and the firmware upgrade data reach the target display, configure a display firmware upgrade module to execute a firmware upgrade preparation process according to the upgrade start command, and write the firmware upgrade data to a firmware storage device of the target display;
   configuring the host firmware upgrade module to transmit a request for obtaining a firmware upgrade result to the target display; and
   configuring each of the plurality of displays to:
   receive the request for obtaining the firmware upgrade result through the receiver circuit;
   configure the multi-stream processing module to determine whether the request for obtaining the firmware upgrade result reaches the target display;
   in response to determining that the request for obtaining the firmware upgrade result does not reach the target display, transmit the request to the next display through the transmitter circuit;
   in response to determining that the request for obtaining the firmware upgrade result reaches the target display, configure the display firmware upgrade module to check firmware data in the firmware storage device and transmit an upgrade result message to the host,
   wherein the host firmware upgrade module is configured to include the upgrade start command and the firmware upgrade data in a sideband message, and to transmit the sideband message through the DP auxiliary channel, and the sideband message includes a message header and a message body, wherein in the step of determining whether the upgrade start command and the firmware upgrade data reach the target display, the multi-stream processing module is further configured to analyze the message header to obtain a total link count and a remaining link count, and determine whether the remaining link count is a predetermined value; and
   wherein the display firmware upgrade module is configured to determine according to data segment from the multi-stream processing module, whether the data segment corresponds to the upgrade start command or the firmware upgrade data, so as to determine whether to execute the firmware upgrade preparation process according to the upgrade start command, or to write the firmware data into the firmware storage device of the target display.

11. The firmware upgrade system according to claim 10, wherein,
   in response to determining that the remaining link count is not the predetermined value, determine that the sideband message does not reach the target display, subtract 1 from the remaining link count and recombining the remaining link count into the sideband message; and
   in response to determining that the remaining link count is the predetermined value, determine that the sideband message reaches the target display.

12. The firmware upgrade system according to claim 11, wherein, in response to determining that the sideband message reaches the target display, the multi-stream processing module is further configured to analyze the message body to obtain a write identifier, and to transmit the corresponding data segment to the display firmware upgrade module according to the write identifier.

13. The firmware upgrade system according to claim 12, wherein, in response to the selected target display needing to include all of the plurality of displays, the host is configured to insert a specific field into the message body and use a last one of the plurality of display in the daisy chain topology as the target display; and
the multi-stream processing module is configured to analyze the message body, and in response to obtaining the specific field, the multi-stream processing module is configured to directly transmit the data segment corresponding to the write identifier to the display firmware upgrade module.

14. The firmware upgrade system according to claim 13, wherein the display firmware upgrade module is configured to determine, according to the data segment, whether the data segment corresponds to the upgrade start command or the firmware upgrade data, so as to determine whether to execute the firmware upgrade preparation process according to the upgrade start command, or to write the firmware data into the firmware storage device of the target display.

15. The firmware upgrade system according to claim 10, wherein the host is further configured to:
include the upgrade start command in a sideband message, and transmit the sideband message through the DP auxiliary channel, wherein the sideband message includes a message header and a message body; and
assemble the firmware upgrade data in a secondary data packet (SDP) and transmit the SDP to the target display through a DP main link.

16. The firmware upgrade system according to claim 15, wherein in the step of determining whether the upgrade start command and the firmware upgrade data reach the target display, the multi-stream processing module is further configured to:
analyze the message header to obtain a total link count and a remaining link count, and determine whether the remaining link count is a predetermined value;
in response to determining that the remaining link count is not the predetermined value, determine that the sideband message does not reach the target display, subtract 1 from the remaining link count and recombine the remaining link count into the sideband message, and send the sideband message to next one of the displays in the daisy chain topology; and
in response to determining that the remaining link count is the predetermined value, determine that the sideband message reaches the target display.

17. The firmware upgrade system of claim 15, wherein the display firmware upgrade module includes a firmware upgrade circuit and a firmware memory, wherein, in response to determining that the sideband message reaches the target display, the multi-stream processing module is configured to analyze the message body to obtain the upgrade start command, and to control the firmware upgrade circuit to execute the firmware upgrade preparation process according to the upgrade start command; and
wherein, in response to determining that the upgrade start command reaches the target display, the firmware upgrade circuit is configured to store the data packet having the firmware upgrade data in the firmware memory, and write the firmware upgrade data into the firmware storage device.

18. The firmware upgrade system according to claim 17, wherein, in response to the selected target display needing to include all of the plurality of displays, the host firmware upgrade module is configured to insert a specific field into the message body and use a last one of the plurality of display in the daisy chain topology as the target display to transmit the sideband message; and
wherein the firmware upgrade process further includes:
configuring the host firmware upgrade module to transmit the SDP to each of the plurality of displays through the DP main link;
configuring the multi-stream processing module to analyze the message body, and in response to obtaining the specific field, configuring the multi-stream processing module to directly transmit the data segment corresponding to the write identifier to the firmware upgrade circuit; and
in response to the firmware upgrade preparation process being executed, configuring the firmware upgrade circuit to store the SDP with the firmware upgrade data in the firmware memory, and to write the firmware upgrade data into the firmware storage device.

* * * * *